United States Patent
Kim

(10) Patent No.: US 7,262,893 B2
(45) Date of Patent: Aug. 28, 2007

(54) DATA READ/WRITE DEVICE FOR HOLOGRAPHIC WORM AND METHOD THEREOF

(75) Inventor: Ji-deog Kim, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 270 days.

(21) Appl. No.: 11/061,643

(22) Filed: Feb. 22, 2005

(65) Prior Publication Data

US 2005/0185234 A1 Aug. 25, 2005

(30) Foreign Application Priority Data

Feb. 19, 2004 (KR) .................. 10-2004-0011127

(51) Int. Cl.
*G03H 1/04* (2006.01)
(52) U.S. Cl. ............... 359/35; 359/24; 359/25; 369/103; 365/125; 365/216
(58) Field of Classification Search ............. 359/35, 359/24, 25; 369/103; 365/125, 216
See application file for complete search history.

(56) References Cited

U.S. PATENT DOCUMENTS

| | | | | |
|---|---|---|---|---|
| 3,526,505 A | * | 9/1970 | Kroemer ..................... 430/1 |
| 3,602,570 A | * | 8/1971 | Greenaway ................ 359/28 |
| 3,917,380 A | * | 11/1975 | Kato et al. ................. 359/35 |
| 4,988,154 A | * | 1/1991 | Hansen ....................... 359/22 |
| 5,978,346 A | * | 11/1999 | Mizuno et al. ........ 369/112.17 |
| 5,986,779 A | * | 11/1999 | Tanaka et al. .............. 359/19 |
| 6,597,478 B2 | * | 7/2003 | Kim et al. ................... 359/22 |
| 2002/0085250 A1 | | 7/2002 | Kim et al. |
| 2002/0114027 A1 | | 8/2002 | Horimai |
| 2004/0081057 A1 | * | 4/2004 | Miyatake ................... 369/94 |

FOREIGN PATENT DOCUMENTS

JP 10-124872 A 5/1998

OTHER PUBLICATIONS

J.W.C. Gates and S.J. Bennett, Holography with a Double Focus Lens: a Simple Lecture Demonstration, Nature, Jun. 8, 1968, pp. 942-943, vol. 218, XP008069032.

* cited by examiner

*Primary Examiner*—Leonidas Boutsikaris
(74) *Attorney, Agent, or Firm*—Sughrue Mion, PLLC

(57) ABSTRACT

A data writing and reading device is capable of writing and reading data with respect to a holographic storage medium. The data writing and reading device includes a light source which emits a laser beam, a focusing lens unit having a multi-focal lens which splits the laser beam into a reference beam and an object beam and projects the split beams to the storage medium so that an interference pattern between the reference and object beams can be written in the storage medium, and a photo detector for detecting the object beam when the object beam is reproduced in accordance with the holographic data with the incidence of the reference beam to the storage medium. With a simple hardware, data can be written to or read out from the holographic storage medium.

17 Claims, 6 Drawing Sheets

DATA READ/WRITE DEVICE FOR HOLOGRAPHIC WORM AND METHOD THEREOF

CROSS-REFERENCE TO RELATED APPLICATIONS

This application claims the benefit of Korean Patent Application No. 2004-11127 filed Feb. 19, 2004, in the Korean Intellectual Property Office, the disclosure of which is incorporated herein by reference.

BACKGROUND OF THE INVENTION

1. Field of the Invention

The present invention relates to a data read/write device for a holographic storage medium, and more specifically, to a read/write device and method thereof, which enables a low-cost compact optical pick-up system for a holographic storage medium by use of focusing lens unit having a multi-focal lens.

2. Description of the Related Art

With the widespread use of computers, development of peripherals and components that enhance computer operation has increased. Among these efforts, there is a supplemental storage medium which keeps program or information therein even in the event of computer power off. There are a variety of supplemental storage media. A magnetic storage medium and an optical disk storage medium are the representative examples of such supplemental storage media.

The magnetic storage medium includes floppy disk and hard disk, which stores data therein by use of magnetic force. The hard disk has a large memory capacity, and is fast in inputting and outputting information, and therefore, is used as a main supplemental memory device for a personal computer. The floppy disk is convenient to carry and therefore, has been widely used as a supplemental memory device of a personal computer in the past. However, several tens of floppy disks at maximum capacity are frequently required to store multimedia data due to the floppy disk's limited memory capacity. Therefore, the floppy disk is not suitable for the current memory storage trend.

In order to overcome the limited memory capacity of the floppy disk, an optical disk device, or a laser disk device, has been developed. The optical disk has a relatively large memory capacity, and enables a fast search. Therefore, the optical disks are widely used these days. There are representatively a CD-ROM and a digital versatile disk (DVD) as for the optical disks.

However, the rapid advancement in the field of computer and information communications technologies requires storage means of more vast memory capacity. The data which reaches up to several billions of bytes, easily exceeds the storage capacity of a simple CD, and therefore, a new storage medium is now in demand. Recently, a holographic information storage that utilizes the photorefractive effect, which refers to a local change in the index of refraction of the material due to incident light, has been suggested.

The holographic information storage stores information in a photosensitive non-organic crystal or a polymer material in the form of optical interference patterns. The optical interference pattern is formed by use of two laser beams which interfere with each other. In other words, a reference beam containing no data and an object beam containing a data therein interfere with each other, forming an interference pattern. As the interference pattern causes chemical or physical changes in the photosensitive storage medium, the data is stored. A storage medium storing an image of object in the interference pattern or the interference pattern itself is called a hologram, and a holography relates to an art of using the hologram.

Meanwhile, a storage medium using holography can store information in a three-dimensional space of a photorefractive crystal. Because multiple holograms can be multiplexed in the same region of the storage medium in accordance with angles, phases and wavelengths of the reference beam, data of high density can be reproduced with speed and storage capacity is also improved.

The hologram information storage can be divided into a page-based storage and a bit-based storage in accordance with the specific method of storage as employed. The page-based storage forms bit data into a two-dimensional page, and records data by use of a spatial light modulator (SLM). The bit-based storage modulates the light intensity of the object beam according to the binary data or to the coded data. In the page-based storage, a vast amount of data can be recorded or reproduced, and therefore, high speed data input and output can be obtained. However, the price of devices such as a SLM for data input, or a data detector for the reproduced page, is too high to be commercialized at the consumer level. Furthermore, it is difficult to ensure the satisfactory compatibility with the existing optical disk drive.

Meanwhile, the bit-based storage system attracts attention of the industry. In WORM (write once and read many) system, in particular, the user can directly write the data to reproduce, and therefore, it is unnecessary to adopt a writing method as fast as the page storage. As a result, it is possible to realize an economic bit-based storage system.

FIG. 1 shows the structure of a conventional data write/read device which writes data to holographic WORM according to bit-based storage method.

Referring to FIG. 1, a data write/read device includes a laser beam emitting device 40, a phase conjugator 20, a disk rotation axis 30, and an optical signal detecting device 50. A holographic storage medium 10 is made to the disk type, and aligned on the phase conjugator 20.

The laser beam emitting device 40 includes a light source 41, a beam splitter 43, and an objective lens 45. When a laser is emitted from the light source 41, the laser beam changes its path as it passes through the beam splitter 43, and coverges on a predetermined area of the holographic storage medium 10.

As the laser beam is emitted to the holographic storage medium 10, a part of the laser beam is transmitted through the holographic storage medium 10 and then reflected by the phase conjugator 20 provided at the lower side and therefore, enters into the holographic storage medium 10. Accordingly, the reflected laser beam from the phase conjugator 20 interferes with the laser beam emitted from the laser beam emitting device 40, generating an interference pattern. The interference pattern is recorded in the storage medium 10 as hologram data.

FIG. 2 shows an enlargement of an encircled area 'a' of the holographic storage medium 10 of FIG. 1 to which a laser beam is converged. Referring to FIG. 2, a laser beam is converged to the holographic storage medium 10 and forms a waist at a predetermined depth of the holographic storage medium 10. The laser beam is reflected in the direction of entering. As a result, interference of laser beams occurs, and holographic data is recorded in the holographic storage medium 10.

The holographic storage medium 10 is formed to a disk type, which rotates about the disk rotation axis 30, varying the surface where the laser beam enters and therefore, recording and reproducing data.

Meanwhile, in order to reproduce data, a laser beam is emitted from the laser beam emitting device 40 to the holographic storage medium 10 at the identical wavelength as that of the data recording. The object beam is reproduced as if it comes from the phase conjugator 20, the data is to be analyzed by detecting the object beam through the photo detector 50.

In the conventional art, however, the phase conjugator 20 is made from a single crystal structure, and therefore, it is quite difficult and expensive to make the phase conjugator 20 as large as the holographic storage medium 10. Accordingly, a lot of doubts still remain for the commercialization. Furthermore, because the depth of the waist of the laser beam must be multiplexed for high recording density, multi-layered optical disk technology is required. However, multi-layered recording becomes difficult to achieve if recording requires several tens of layers, instead of several layers.

SUMMARY OF THE INVENTION

Accordingly, the present general inventive concept has been made in view of the above-mentioned shortcomings and/or problems, and an aspect of the present general inventive concept is to provide a data write/read device and a method thereof, which enables simple data writing/reading by use of multi-focal lens, and can therefore provide a holographic WORM with low-price hardware.

The above aspects and/or other features of the present invention can substantially be achieved by providing a holographic data writing device, which includes a light source for emitting a laser beam, and a focusing lens unit projecting the split reference beam and object beam to a holographic data writable storage medium in a manner such that the reference and object beams interfere with each other and the interference pattern thereof is written in the storage medium.

The focusing lens unit has a multi-focal lens which is divided into first and second areas in a manner such that the light transmitting the respective areas are converged at different focal points, respectively. The focusing lens unit splits the laser beam from the light source into the reference beam for transmitting to one of the first and the second areas, and the object beam for transmitting to the other area of the first and the second areas, and accordingly records data.

The data may preferably, but not necessarily be written in the same location of the storage medium by one of wavelength multiplexing, speckle multiplexing and shift multiplexing, where the wavelength multiplexing varies the wavelength of the laser beam from the light source, the speckle multiplexing uses a speckle pattern of the reference beam which is incident on the focusing lens unit, and the shift multiplexing moves a spot of the object beam being incident to the storage medium and a spot of the reference beam.

A beam splitter may be further provided for varying a path of the laser beam from the light source so that the laser beam falls incident to the storage medium in a substantially perpendicular relation.

The storage medium may be a write-once read-many (WORM) memory which includes one of a photorefractive crystal and a photopolymer. The multi-focal lens may have a circular lens having an inner center area as the first area, and an outer area surrounding the inner center area as the second area.

According to one aspect of the present invention, a holographic data reading device includes a light source for emitting a laser beam, a focusing lens unit for adjusting an area of laser beam transmission such that only a reference beam falls incident to a storage medium which stores therein a holographic data based on an interference pattern of the reference beam and an object beam, and a photo detector for detecting the object beam when the object beam is reproduced in accordance with the holographic data with the incidence of the reference beam to the storage medium.

The focusing lens unit may have a multi-focal lens having first and second areas such that a light passing through the respective areas converges on different focal points, respectively; and a laser beam aperture unit for blocking a laser beam from one of the first and the second areas.

The storage medium may be a holographic storage medium on which an interference pattern of a reference beam and an object beam is written as a holographic data, the reference beam being transmitted through one of the first and the second areas, and the object beam being transmitted to the other of the first and the second areas. The laser beam aperture unit blocks the laser beam from falling incident to one of the first and the second areas such that only the reference beam falls incident to the storage medium and the object beam is restored from the storage medium.

The photo detector may preferably further include an objective lens which causes the object beam reproduced from the storage medium to converge to the photo detector.

A beam splitter may be additionally provided for varying a path of the laser beam from the light source so that the laser beam falls incident to the storage medium in a substantially perpendicular relation.

According to one aspect of the present invention, a holographic data writing method includes (a) emitting a laser beam toward a storage medium which can reproduce a holographic data, (b) emitting the laser beam as an object beam and a reference beam toward the storage medium, and (c) writing an interference pattern of the object beam and the reference beam as the holographic data.

The step (b) may include emitting the laser beam to a multi-focal lens, the multi-focal lens having first and second areas such that a light passing through the respective areas converges on different focal points, respectively, and the laser beam being split into an object beam transmitting through one of the first and the second areas, and a reference beam transmitting through the other of the first and the second areas.

According to one aspect of the present invention, (d) writing the data in the same location of the storage medium, by one of a wavelength multiplexing, a speckle multiplexing and a shift multiplexing, may additionally be included so that a huge amount of data can be written in the storage medium. Here, the wavelength multiplexing varies the wavelength of the laser beam from the light source, the speckle multiplexing uses a speckle pattern of the reference beam which is incident on the focusing lens unit, and the shift multiplexing moves a spot of the object beam being incident to the storage medium and a spot of the reference beam.

The storage medium may be a write-once read-many (WORM) memory which includes one of a photorefractive crystal and a photopolymer. The multi-focal lens may have a circular lens having an inner center area as the first area, and an outer area surrounding the inner center area as the second area.

According to one aspect of the present invention, a holographic data reading method with respect to a storage medium holding therein a holographic data based on a predetermined interference pattern, may include the steps of emitting a laser beam to a multi-focal lens having first and second areas of different focal distances, respectively, blocking a laser beam from the first area so that a laser beam can only be transmitted to the second area, restoring a predetermined object beam according to the laser beam which is passed through the second area and transmitted to the interference pattern, and reading a data by detecting the object beam.

The storage medium may be a write-once read-many (WORM) memory which includes one of a photorefractive crystal and a photopolymer.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE EXEMPLARY EMBODIMENTS

Figure 1:
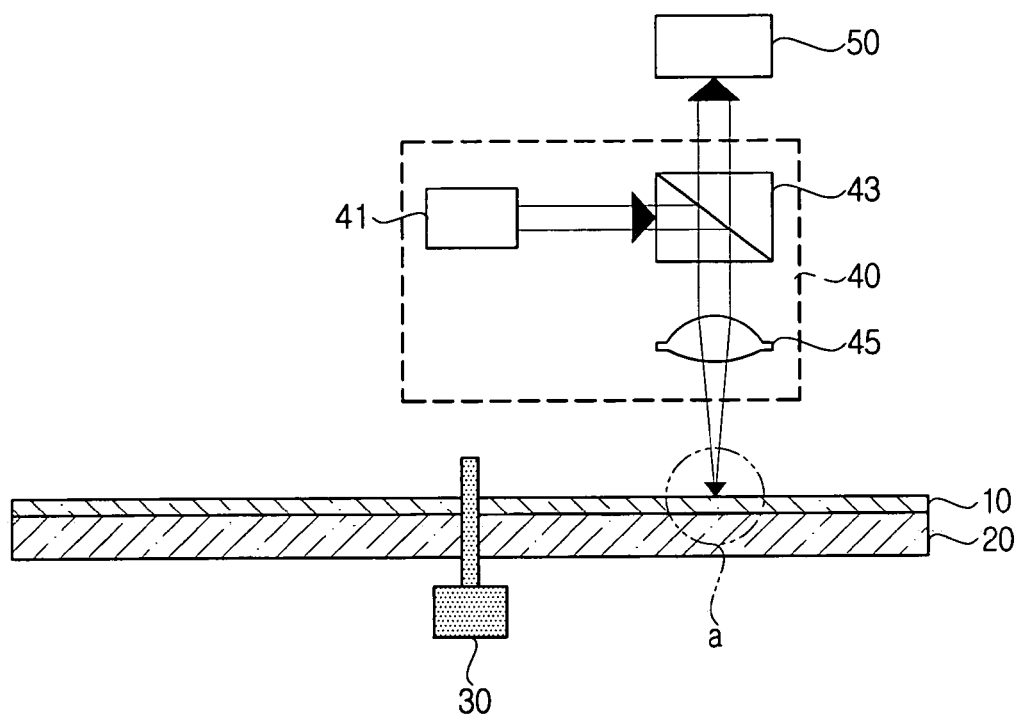
FIG. 1 is a view illustrating the construction of a conventional holographic data write/read device.
Figure 2:
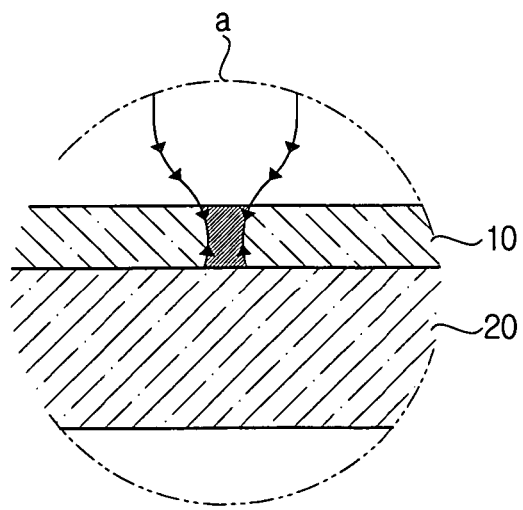
FIG. 2 is a view provided for the explanation of a holographic data write method of the data write/read device of FIG. 1.

Certain embodiments of the present invention will be described in greater detail with reference to the accompanying drawings.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 3:
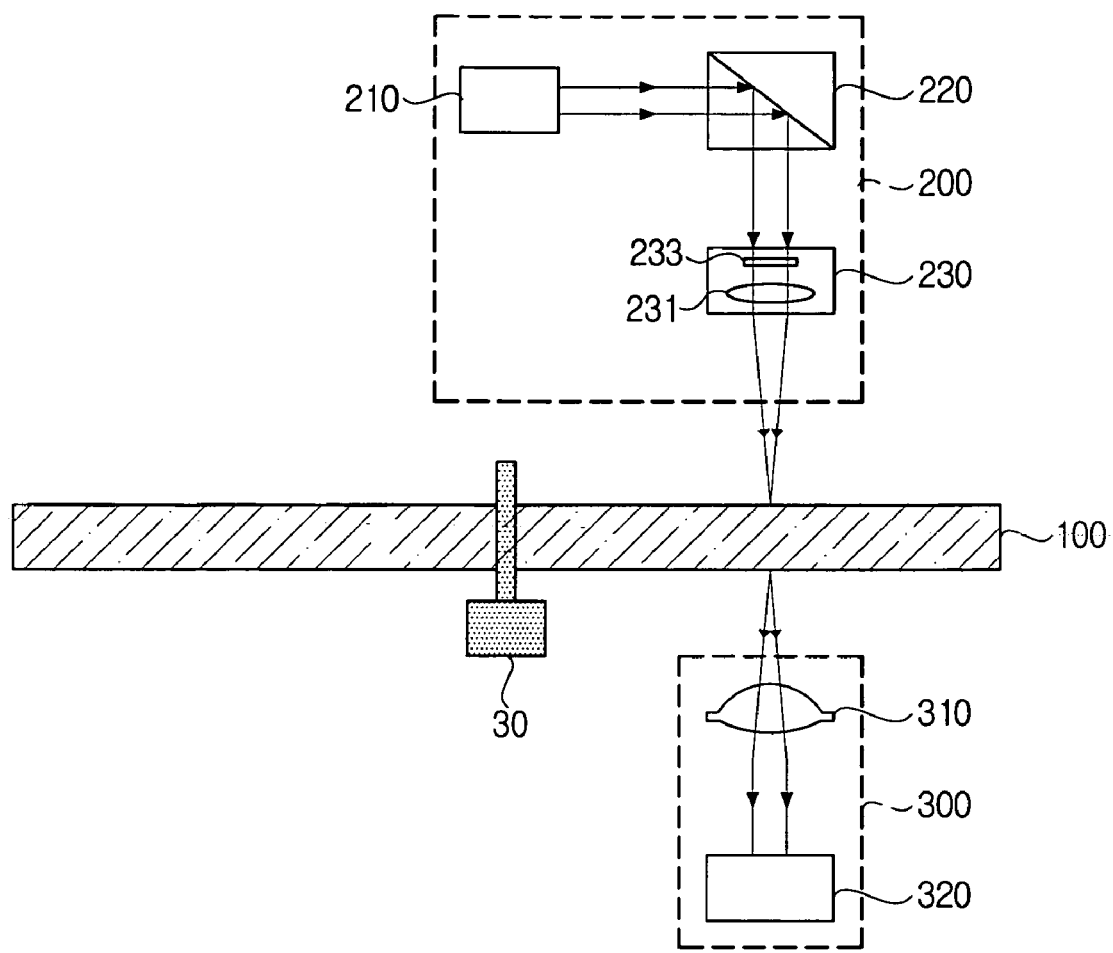
FIG. 3 is a view illustrating the construction of a holographic data write/read device according to an exemplary embodiment of the present invention.

FIG. 3 is a view illustrating the construction of a holographic data write/read device according to an exemplary embodiment of the present invention.

Referring to FIG. 3, a data write/read device according to one exemplary embodiment of the present invention includes a data write device 200 and a data read device 300. The data write device 200 includes a light source 210, a beam splitter 220, and a focusing lens unit 230. The data read device 300 includes an objective lens 310 and a photo detector 320.

The holographic storage medium 100 is made to a disk type, which rotates about a disk rotation axis 30, writing and reading data accordingly. The holographic storage medium 100 is made of a photorefractive crystal or a photopolymer, and stores data in three-dimensional way by use of volume holography.

The data write device 200 emits a reference beam and a object beam to a predetermined area of the holographic storage medium 100, which interfere with each other, and thereby stores holographic data. First, a laser beam emitted from the light source 210 changes advancing path as the light beam passes through the beam splitter 220, and therefore, strikes the holographic storage medium 100. The light source 210 may have a collimator lens therein to convert the laser beam into a parallel ray, such that the laser beam can be outputted as a parallel laser beam.

After changing the advancing path, the laser beam is divided into a reference beam and a object beam by the focusing lens unit 230. The focusing lens unit 230 includes a multi-focal lens 231 and a laser beam aperture unit 233.

The laser beam aperture unit 233 blocks a part of the laser beam from entering to the multi-focal lens 231, and accordingly adjusts the area of light incidence.

The multi-focal lens 231 is, instead of conventional objective lens which usually has a single focal point, a lens having multiple focal points. More specifically, a dual-focal lens may be used. A dual-focus lens is divided into a first area of first focal point and a second area of second focal point. A light to the first area is focused on the first focal point, while a light to the second area is focused on the second focal point. Accordingly, if a laser beam from the light source 210 is simultaneously entered to the first and the second areas, there can be first and second laser beams each being projected to the first and the second areas. One of the first and the second laser beams would constitute a object beam, while the other constitutes a reference beam. Accordingly, the two beams interfere with each other in a predetermined area of the storage medium 100, and therefore, holographic data corresponding to the interference pattern is recorded.

Referring to one certain embodiment of the present invention as shown in FIGS. 4A through 5B, a circular multi-focal lens 231 is used.

Figure 4A:
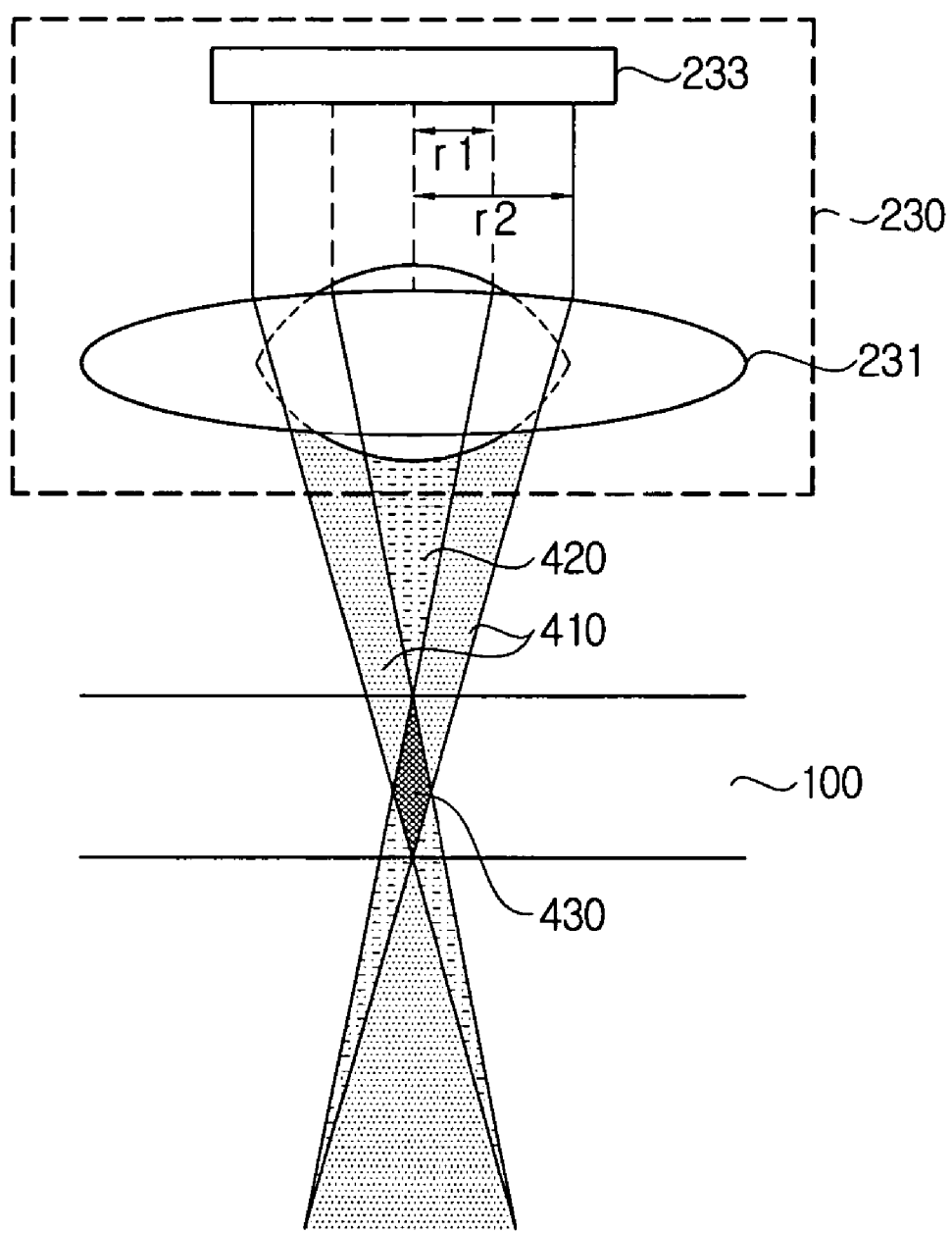
FIGS. 4A and 4B are views provided for the explanation of a holographic data write and read method according to an exemplary embodiment of the present invention.
Figure 4B:
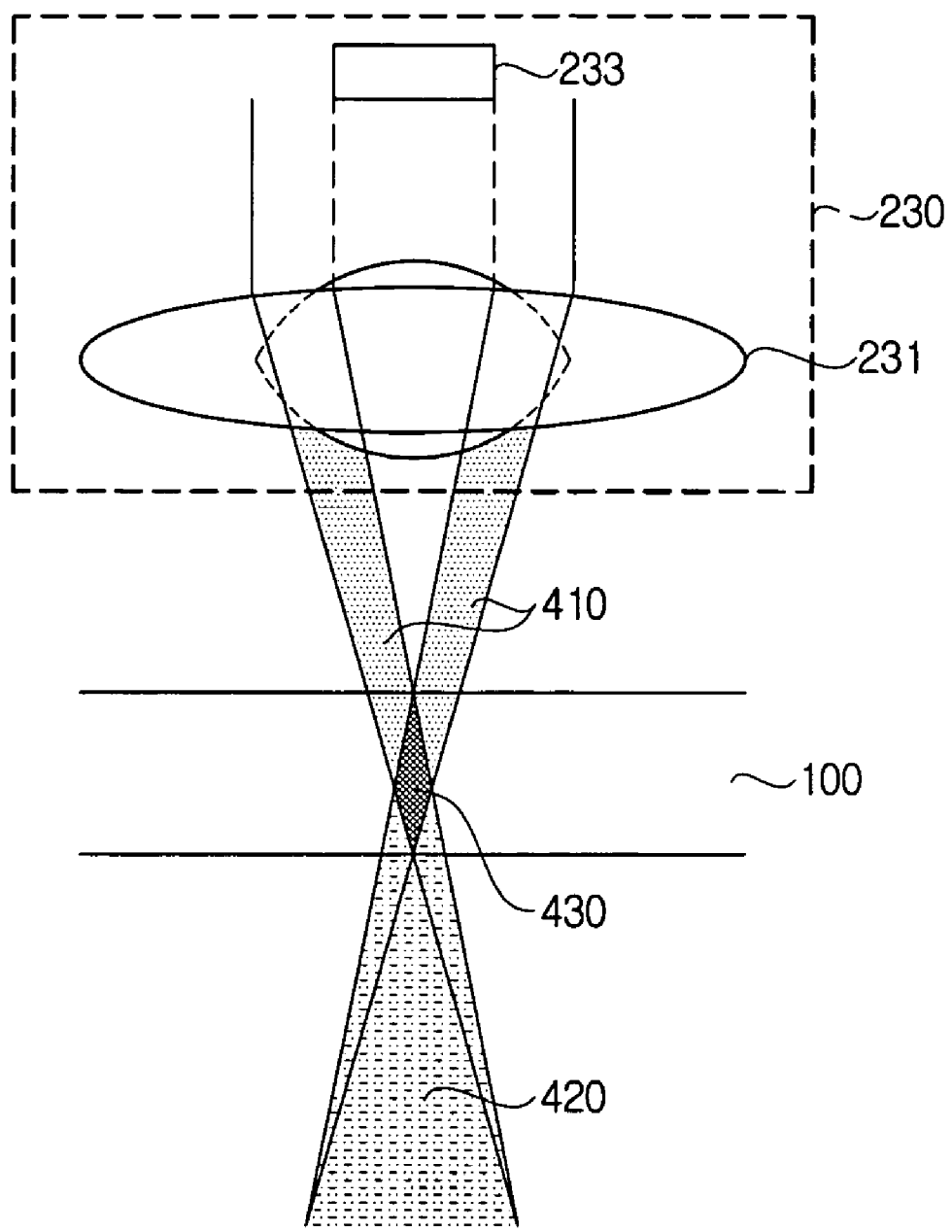

First, FIGS. 4A and 4B show the process of writing data to the holographic storage medium 100 by using the focusing lens unit 230. Referring to FIG. 4A, the multi-focal lens 231 is a circular lens having a radius r2. The multi-focal lens 231 is divided into a center area (r1), and the rest area (r2−r1), each having a different radius of curvature and therefore, having different focal points. Accordingly, a laser beam from the light source 210 is divided into a first laser beam transmitting to the center area (r1), and a second laser beam transmitting to the rest area (r2−r1), respectively.

Referring to FIG. 4A, the first laser beam is converged near to the front surface of the holographic storage medium 100, while the second laser beam is converged near to the rear surface of the holographic storage medium 100.

Although FIG. 4A shows one certain example where a circular multi-focal lens 231 is used, one will note that it should not be considered as limiting. The multi-focal lens 231 of any other forms can be utilized, so long as it can ensure that a focal distance of the light varies according to the area of the light incidence.

Figure 5A:
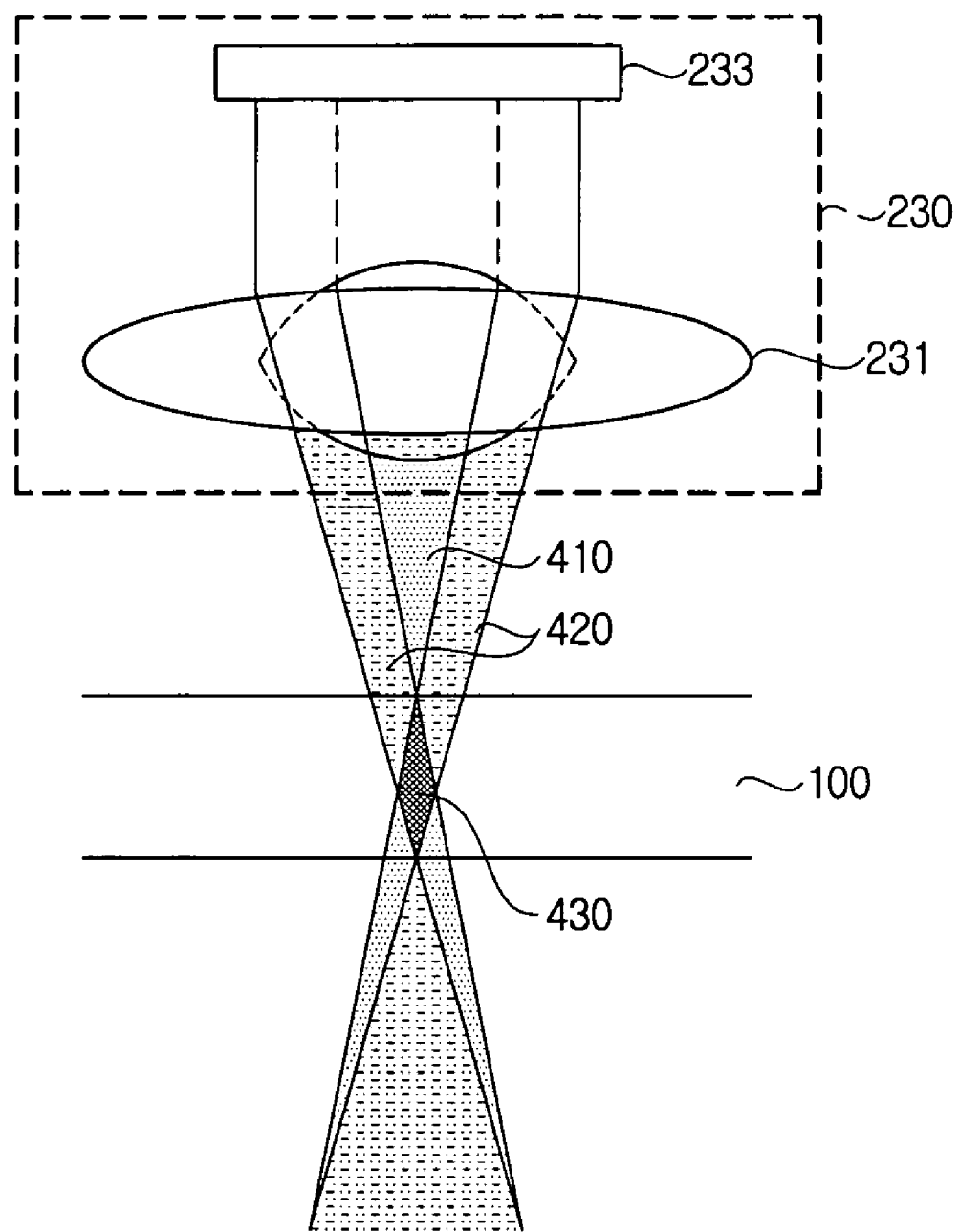
FIGS. 5A and 5B are views provided for the explanation of a holographic data write and read method according to another exemplary embodiment of the present invention.

Meanwhile, whether to use the laser beam transmittable to the area (r1) as a object beam 420 or as a reference beam 410, can be determined by a manufacturer. For example, FIG. 4A shows the example where the laser beam transmitting to the area (r1) is used as the object beam 420, and FIG. 5A shows the example where the laser beam transmitting the area outside the area (r1) is used as the object beam 420.

First, as shown in FIG. 4A, when the laser beam transmitting the area (r1) is used as the object beam 420, the object beam 420 is converged near to the front surface of the holographic storage medium 100, while the reference beam 410 transmitting to the outside of the area (r1) is converged near to the rear surface of the holographic storage medium 100. Accordingly, interference of laser beams occur at a predetermined depth of the holographic storage medium 100. Accordingly, at the interference area 430 as shown in FIG. 4A, the interference pattern is written as the holographic data. The data write device 200 modulates the light intensity in accordance with the bits of the data, and emits the laser beam. Accordingly, a holographic data of certain pattern can be written.

For the convenience of explanation, FIG. 4A shows the reference and object beams 410 and 420 respectively converged near to the front and the rear surfaces of the holographic storage medium 100. However, one will note that this is only for the exemplary purpose. In an alternative example, a multi-focal lens 231 having focal points to cause interference at a certain area of the holographic storage medium 100 can be appropriately used.

Meanwhile, the multiplexing such as wavelength multiplexing, shift multiplexing and speckle multiplexing can be used.

With the wavelength multiplexing, wavelength of the laser beam striking the holographic storage medium 100 is multiplexed and irradiated such that data can be written in the same location of the holographic storage medium 100 in correspondence with the respective wavelengths of the laser beam. With the shift multiplexing, both the object beam 420 and the reference beam 410 are made to hit the holographic storage medium 100, with the spot thereof each time moving a little distance within an allowable range. The speckle multiplexing randomizes the distribution of intensities and phases of the reference beam, and accordingly writes data using a speckle pattern of the laser beam irradiated to the holographic storage medium 100.

FIG. 4B illustrates the process in which data, which is written in accordance with the exemplary embodiment of FIG. 4A, is read out from the holographic storage medium 100.

Referring to FIG. 4B, data can be read out by using the reference beam 410, which was used for data writing, that is, by illuminating the reference beam 410 to the holographic storage medium 100.

As described above, a laser beam emitted from the light source 210 changes optical path as it passes through the beam splitter 220. When the laser beam passes through the focusing lens unit 230, the area of transmission is adjusted so that only the reference beam 410, which was used for the data writing, can be transmitted. In order to adjust the area of transmission, the laser beam aperture unit 233 blocks the laser beam of the center area (r1) so that only the reference beam 410 passing through the outside of the center area (r1) can be transmitted to the holographic storage medium 100.

When the reference beam 410 is transmitted to the interference pattern area 430, the object beam 420 is reproduced, and detected at the rear surface of the holographic storage medium 100. The data reading device 300 converges the object beam 420 by using the objective lens 310 and detects the data by using the photo detector 320. In other words, data bit is determined by detecting the intensity of the reproducing object beam 420.

As mentioned above, the laser beam aperture unit 233 adjusts the transmission area of the laser beam for data reading so that only the reference beam can be transmitted to the holographic storage medium 100. Such a laser beam aperture unit 233 may be formed of a simple screen layer. However, using an aperture is more preferable, especially in terms of the fact that the area of transmission can be more precisely adjusted.

FIG. 5A illustrates one exemplary embodiment in which the laser beam transmitting to the center area (r1) is used as the reference beam 410.

Referring to FIG. 5A, the reference beam 410 is converged near to the front surface of the holographic storage medium 100, and the object beam 420 is converged near to the rear surface of the holographic storage medium 100. Accordingly, the interference of the signals is occurred at a certain area 430 of the holographic storage medium 100.

Figure 5B:
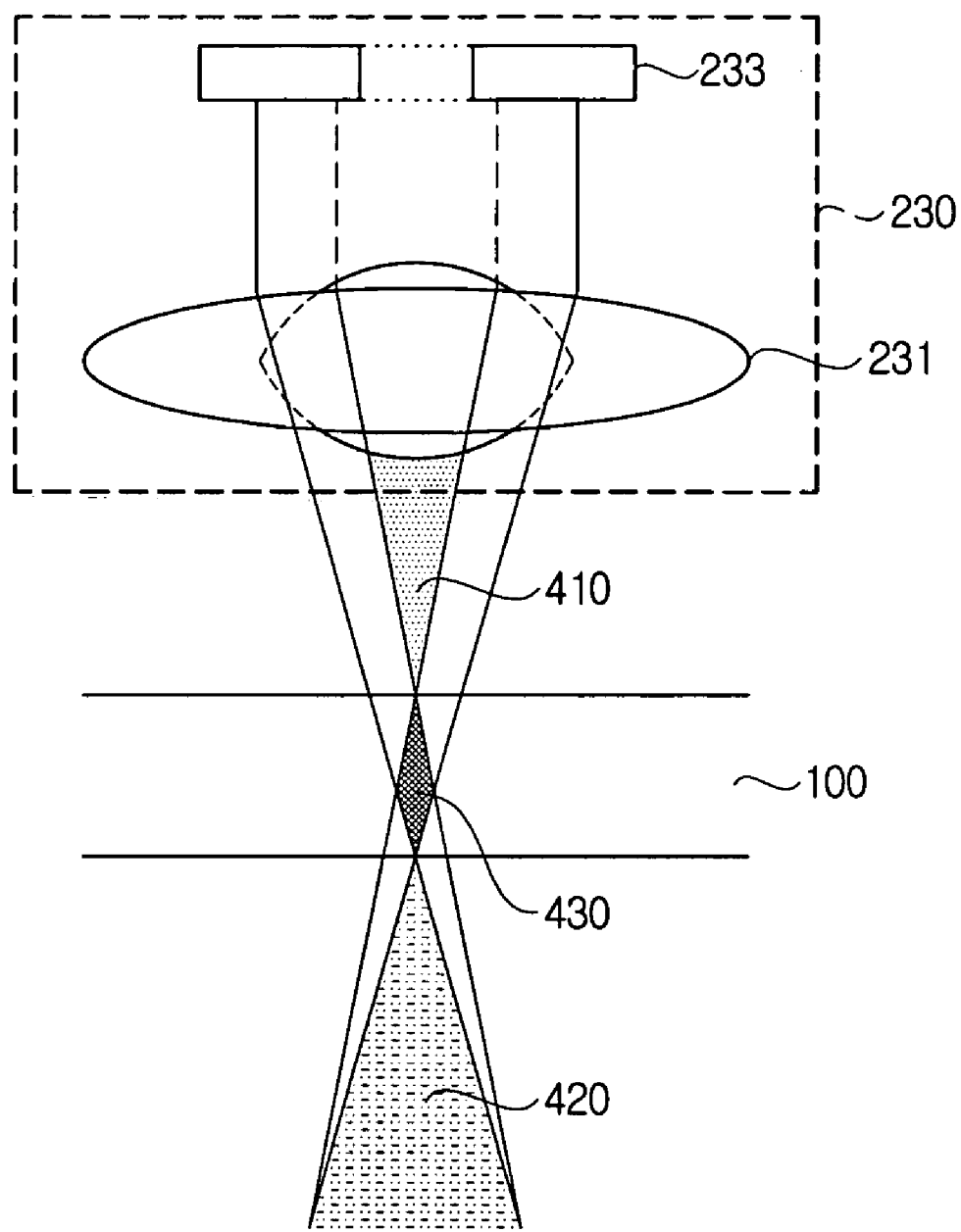

FIG. 5B illustrates the process in which the data, which is written in accordance with the embodiment of FIG. 5A, is read out from the holographic storage medium 100.

Referring to FIG. 5B, the light to the outside of the center area (r1) is blocked, and therefore, the reference beam 410 is transmitted only to the center area (r1). Because the reference beam 410 is transmitted to the interference area 430, the object beam is output to the lower side of the holographic storage medium 100. Like the exemplary embodiment as shown in FIG. 4B, the output of the object beam is converged by the objective lens 310, and the data is detected by the photo detector 320.

Meanwhile, the embodiments as shown in FIGS. 5A and 5B are also applicable to shift multiplexing, speckle multiplexing and wavelength multiplexing. Here, because the reference beam 410 is located at the center of the optical axis, which is different from the case of FIGS. 4A and 4B, selectivity by radius of curvature may deteriorate, and therefore, the shift multiplexing may have degraded efficiency. Accordingly, speckle multiplexing or wavelength multiplexing may provide higher efficiency than using the shift multiplexing.

According to another aspect of the exemplary present invention, the center area (r1) and the outside of the center area (r1) may be optically coated to different transmissivity so that the intensity of the light transmitted through each area varies.

According to the present invention which has been described so far with reference to a few exemplary embodiments of the present invention, a laser beam can be split into the reference and object beams by using a simple hardware, and without requiring expensive devices such as phase conjugator. As a result, data writing and reading with respect to the holographic storage medium can be performed in a relatively simple way.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A holographic data writing device, comprising:
a light source that emits a laser beam; and
a focusing lens unit, which splits the laser beam into a reference beam and an object beam, and projects the split beams to a holographic data writable storage medium in a manner such that the reference and object beams interfere with each other and an interference pattern thereof is written in the storage medium;
wherein the focusing lens unit comprises a multi-focal lens which into first and second areas in a manner such that the light transmitting the respective areas are converged at different focal points, respectively.

2. The holographic data writing device of claim 1, wherein the focusing lens unit splits the laser beam from the light source into the reference beam for transmitting to one of the first and the second areas, and the object beam for transmitting to the other area of the first and the second areas.

3. The holographic data writing device of claim 2, wherein the data is written in the same location of the storage medium by one of a wavelength multiplexing, a speckle multiplexing and a shift multiplexing, the wavelength multiplexing comprises varying the wavelength of the laser beam from the light source, the speckle multiplexing comprises using a speckle pattern of the reference beam which is incident on the focusing lens unit, and the shift multiplexing comprises moving a spot of the object beam being incident to the storage medium and a spot of the reference beam.

4. The holographic data writing device of claim 3, further comprising a beam splitter for varying a path of the laser beam from the light source so that the laser beam falls incident to the storage medium in a substantially perpendicular relation.

5. The holographic data writing device of claim 2, wherein the storage medium comprises a write-once read-many (WORM) memory which comprises one of a photo-refractive crystal and a photopolymer.

6. The holographic data writing device of claim 5, wherein the multi-focal lens comprises a circular lens having an inner center area as the first area, and an outer area surrounding the inner center area as the second area.

7. A holographic data reading device, comprising:

a light source that emits a laser beam;

a focusing lens unit that adjusts an area of laser beam transmission such that only a reference beam falls incident to a storage medium which stores therein a holographic data based on an interference pattern of the reference beam and an object beam; and a photo detector that detects the object beam when the object beam is reproduced in accordance with the holographic data with the incidence of the reference beam to the storage medium;

wherein the focusing lens unit comprises:

a multi-focal lens having first and second areas such that a light passing through the respective areas converges on different focal points, respectively; and a laser beam aperture unit for blocking a laser beam from one of the first and the second areas.

8. The holographic data reading device of claim 7, wherein the storage medium comprises a holographic storage medium on which an interference pattern of a reference beam and an object beam are written as a holographic data, the reference beam being transmitted through one of the first and the second areas, and the object beam being transmitted to the other of the first and the second areas.

9. The holographic data reading device of claim 8, wherein the laser beam aperture unit blocks the laser beam from falling incident to one of the first and the second areas such that only the reference beam falls incident to the storage medium.

10. The holographic data reading device of claim 9, wherein the photo detector comprises an objective lens which causes the object beam reproduced from the storage medium to converge to the photo detector.

11. The holographic data reading device of claim 9, further comprising a beam splitter for varying a path of the laser beam from the light source so that the laser beam falls incident to the storage medium in a substantially perpendicular relation.

12. A holographic data writing method, comprising the steps of:

(a) emitting a laser beam toward a storage medium which can reproduce a holographic data;

(b) emitting the laser beam as an object beam and a reference beam toward the storage medium; and (c) writing an interference pattern of the object beam and the reference beam as the holographic data.

wherein the step (b) comprises:

emitting the laser beam to a multi-focal lens, the multi-focal lens having first and second areas such that a light passing through the respective areas converges on different focal points, respectively; and the laser beam being split into an object beam transmitting through one of the first and the second areas, and a reference beam transmitting through the other of the first and the second areas.

13. The holographic data writing method of claim 12, further comprising (d) writing the data in the same location of the storage medium by one of a wavelength multiplexing, a speckle multiplexing and a shift multiplexing, the wavelength multiplexing comprises varying the wavelength of the laser beam from the light source, the speckle multiplexing comprises using a speckle pattern of the reference beam which is incident on the focusing lens unit, and the shift multiplexing comprises moving a spot of the object beam being incident to the storage medium and a spot of the reference beam.

14. The holographic data writing method of claim 12, wherein the storage medium comprises a write-once read-many (WORM) memory which comprises one of a photo-refractive crystal and a photopolymer.

15. The holographic data writing method of claim 14, wherein the multi-focal lens comprises a circular lens having an inner center area as the first area, and an outer area surrounding the inner center area as the second area.

16. A holographic data reading method with respect to a storage medium holding therein a holographic data based on a predetermined interference pattern, the holographic data reading method comprising:

emitting a laser beam to a multi-focal lens having first and second areas of different focal distances, respectively;

blocking a laser beam from the first area so that a laser beam can only be transmitted to the second area;

restoring a predetermined object beam according to the laser beam which is passed through the second area and transmitted to the interference pattern; and reading a data by detecting the object beam.

17. The holographic data writing method of claim 16, wherein the storage medium comprises a write-once read-many (WORM) memory which comprises one of a photo-refractive crystal and a photopolymer.

* * * * *